(12) United States Patent
Brunone

(10) Patent No.: US 11,667,472 B2
(45) Date of Patent: Jun. 6, 2023

(54) BELT CONVEYOR WITH DISTRIBUTED MOTORIZATION, AND ASSOCIATED MATERIAL TRANSPORT METHOD

(71) Applicant: René Brunone, Saint-Marcel (FR)

(72) Inventor: René Brunone, Saint-Marcel (FR)

( * ) Notice: Subject to any disclaimer, the term of this patent is extended or adjusted under 35 U.S.C. 154(b) by 0 days.

(21) Appl. No.: 16/812,052

(22) Filed: Mar. 6, 2020

(65) Prior Publication Data

US 2020/0283236 A1 Sep. 10, 2020

(30) Foreign Application Priority Data

Mar. 6, 2019 (FR) ...................................... 19 02294

(51) Int. Cl.
 *B65G 23/08* (2006.01)
 *B65G 15/60* (2006.01)
 *B65G 39/12* (2006.01)

(52) U.S. Cl.
 CPC ............. *B65G 23/08* (2013.01); *B65G 15/60* (2013.01); *B65G 39/12* (2013.01); *B65G 2201/045* (2013.01); *B65G 2811/09* (2013.01)

(58) Field of Classification Search
 CPC ........ B65G 23/08; B65G 15/60; B65G 39/12; B65G 2201/045; B65G 2811/09; B65G 15/06; B65G 15/08; B65G 39/125; B65G 39/14; B65G 39/145; B65G 39/16; B65G 23/10; B65G 23/04; B65G 23/06; B65G 23/12
 USPC .......................................... 198/835, 824–830
 See application file for complete search history.

(56) References Cited

U.S. PATENT DOCUMENTS

| | | | | |
|---|---|---|---|---|
| 2,304,419 A | * | 12/1942 | Pratt ..................... | B65G 23/36 198/835 |
| 2,759,596 A | * | 8/1956 | Keller .................... | B65G 23/04 198/830 |
| 3,189,166 A | * | 6/1965 | Ziller ..................... | B65G 15/60 198/835 |
| 3,583,325 A | * | 6/1971 | Melin ..................... | B66B 21/10 198/324 |
| 3,880,275 A | * | 4/1975 | Fischer .................. | B65G 23/22 198/825 |
| 4,339,031 A | * | 7/1982 | Densmore .............. | B65G 41/02 198/861.2 |

(Continued)

FOREIGN PATENT DOCUMENTS

| | | | | |
|---|---|---|---|---|
| DE | 19639091 A1 | | 3/1998 | |
| DE | 102012013461 A1 | * | 12/2012 | ............... F24S 25/12 |

(Continued)

OTHER PUBLICATIONS

"Patent Translate Deacription EP 2261144" EPO (Year: 2022).*

(Continued)

*Primary Examiner* — Mark A Deuble
(74) *Attorney, Agent, or Firm* — Knobbe, Martens, Olson & Bear, LLP

(57) ABSTRACT

A belt conveyor includes a conveyor belt configured to move in a longitudinal direction. The conveyor belt has two large faces, and a number of support stations distributed longitudinally along the conveyor belt. The support stations are configured to support the conveyor belt by one of the large faces. At least one support station includes a drive motor configured to drive the conveyor belt in the longitudinal direction relative to the support stations.

7 Claims, 2 Drawing Sheets

(56) References Cited

U.S. PATENT DOCUMENTS

| | | | | |
|---|---|---|---|---|
| 5,088,596 A * | 2/1992 | Agnoff | ............... | B65G 13/073 |
| | | | | 198/788 |
| 5,141,097 A * | 8/1992 | Oiry | ............... | B65G 43/08 |
| | | | | 198/444 |
| 7,866,463 B2 * | 1/2011 | Brunone | ............... | B65G 15/08 |
| | | | | 198/819 |
| 2005/0199282 A1 * | 9/2005 | Oleinick | ............... | H01L 31/048 |
| | | | | 136/256 |
| 2008/0078655 A1 * | 4/2008 | Brunone | ............... | B65G 21/06 |
| | | | | 198/824 |
| 2009/0014276 A1 * | 1/2009 | Grilli | ............... | B65G 35/06 |
| | | | | 193/35 R |
| 2018/0251993 A1 * | 9/2018 | Irvine | ............... | B65G 65/005 |

FOREIGN PATENT DOCUMENTS

| | | | | |
|---|---|---|---|---|
| EP | 2261144 A1 * | 12/2010 | ............ | B65G 21/08 |
| WO | 2016/094033 A1 | 6/2016 | | |

OTHER PUBLICATIONS

Anonymous: "VICAT—Brunone", Jan. 14, 2020, XP055657622, Internet extract: URL:http://www.brunone.fr/portfolio/vicat.
Brunone Innovation: "Convoyeur TECHMI Lg 6250 m", YouTube, Jul. 10, 2015, pp. 1-3, XP054980099, Internet extract: URL:http://www.youtube.com/watch?v=IKzHRbAu8RY&feature=emb_logo.
French Search Report for Application No. FR1902294, dated Jan. 17, 2020 in 2 pages.

* cited by examiner

BELT CONVEYOR WITH DISTRIBUTED MOTORIZATION, AND ASSOCIATED MATERIAL TRANSPORT METHOD

CROSS-REFERENCE TO RELATED APPLICATION

This application claims priority to French Patent Application No. FR 19 02294 filed on Mar. 6, 2019, the disclosure of which including the specification, the drawings, and the claims is hereby incorporated by reference in its entirety.

FIELD OF THE INVENTION

The present invention relates to a belt conveyor, of the type comprising:
- a conveyor belt configured to move in a longitudinal direction, the conveyor belt having two large faces, and
- a plurality of support stations distributed longitudinally along the conveyor belt, the support stations being configured to support the conveyor belt via one of the large faces.

Such a conveyor is used, in particular, for transporting divided materials, for example minerals. A drive motor is configured to drive a conveyor belt in a longitudinal direction thereof.

BACKGROUND OF THE INVENTION

To transport a large mass of materials, it is necessary to increase the power of the drive motor. This substantially increases the tension in the conveyor belt at the point where the drive motor exerts a driving force on the belt conveyor.

In addition, when this drive motor is out of order, the conveyor belt is forced to stop until this drive motor is repaired.

In addition, such a conveyor is often supplied by an electrical network. However, it may be complicated to establish the electrical connection between the conveyor and the electrical network.

SUMMARY OF THE INVENTION

One of the aims of the invention is to propose a conveyor whose conveyor belt is subjected to a reduced tension, whose maintenance is facilitated, and whose power supply is simplified.

To this end, the object of the invention is a belt conveyor of the aforementioned type, in which at least one support station comprises a drive motor configured to drive the conveyor belt in the longitudinal direction relative to the support stations.

In particular embodiments of the invention, the belt conveyor also has one or more of the following characteristics, taken alone or according to any technically feasible combination(s):
- the drive motor is supplied with energy by photovoltaic cells and/or at least one wind turbine;
- at least one support station comprises at least one member for driving the conveyor belt, for example a roller, the drive member being rotated by the drive motor and being in direct contact with the conveyor belt, so as to cause the conveyor belt to move in the longitudinal direction,
- the drive motor drives the drive member directly without the interposition of a speed reducer;
- the support stations are successively separated by a distance of between 1 m and 50 m, and advantageously equal to 10 m;
- at least one support station is buried; and
- the photovoltaic cells are in the form of a plate placed above at least one buried support station.

The invention also relates to a method of transporting materials by a belt conveyor comprising:
- a conveyor belt configured to move in a longitudinal direction, the conveyor belt having two large faces, and
- a plurality of support stations distributed longitudinally along the conveyor belt, the support stations being configured to support the conveyor belt by one of the large faces,
- the method comprises driving the conveyor belt in a longitudinal direction relative to the support stations by at least one drive motor, at least one support station being equipped with or one of said drive motors.

BRIEF DESCRIPTION OF THE DRAWINGS

Other characteristics and advantages of the invention will become apparent upon reading the description which follows, given solely by way of example, and made with reference to the appended drawings, in which.

DETAILED DESCRIPTION OF THE PREFERRED EMBODIMENTS

Figure 1:
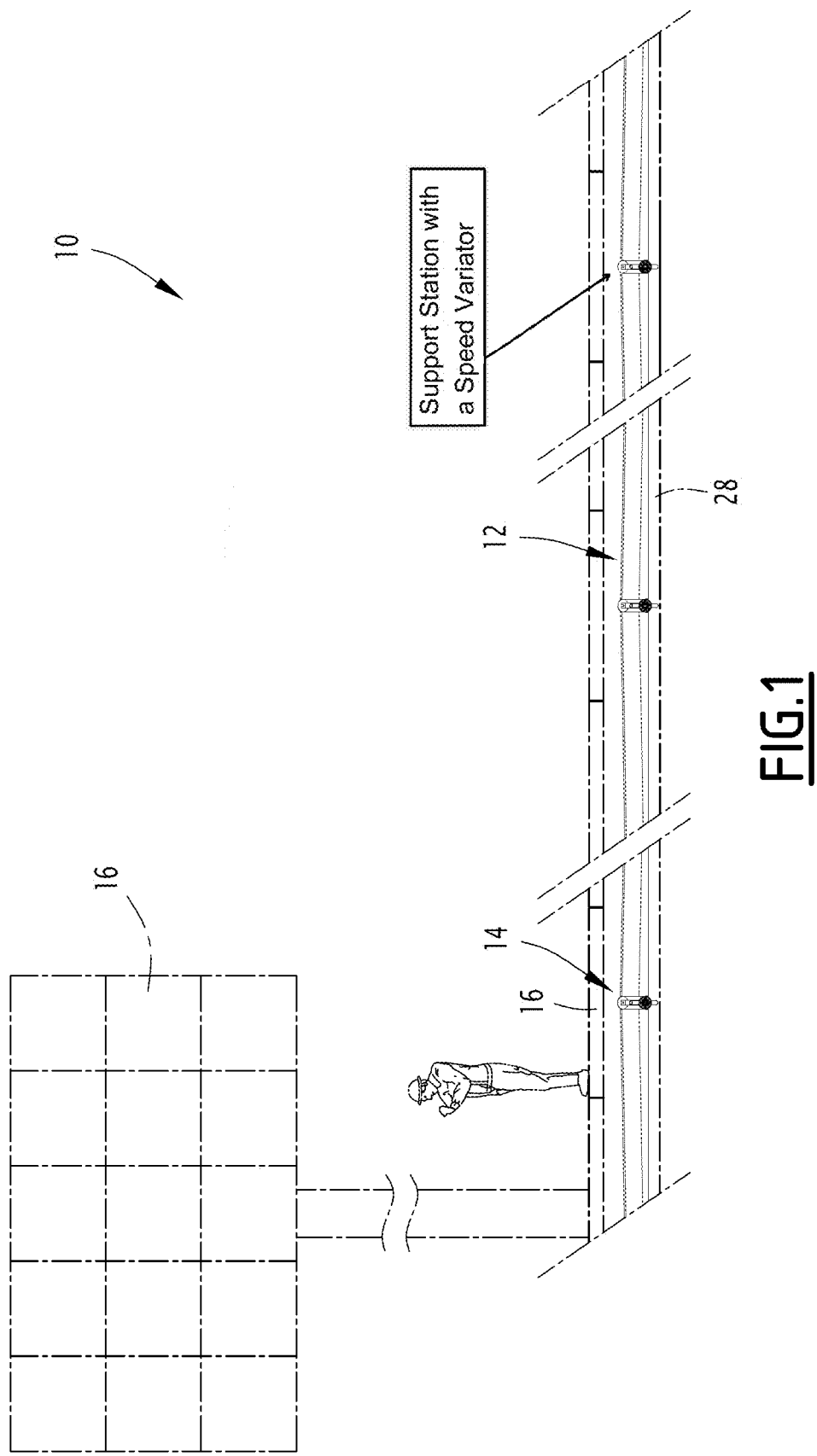
FIG. 1 is a partial side view of a belt conveyor according to the invention.

A belt conveyor 10 is shown in FIG. 1. The belt conveyor 10 is intended for the transport of divided products 11, such as, for example, sand, crushed materials from quarries, or materials from an excavation site of a tunnel.

The belt conveyor 10 includes a conveyor belt 12 configured to move in a longitudinal direction.

The belt conveyor 10 also includes turning rollers (not shown in the Figures).

The belt conveyor 10 also includes a plurality of support stations 14.

The conveyor 10 also includes photovoltaic cells 16 and/or at least one wind turbine 17.

The conveyor belt 12 is made of vulcanized rubber, possibly reinforced with fibers. Alternatively, it may be made of another material, for example a plastic material.

The conveyor belt 12 runs in a closed loop, and thus presents a forward strand 20 and a return strand 22.

The forward strand 20 is used for transporting the materials. The return strand 22 is devoid of materials to be transported. As a variant, the return strand 22 may also be used for transporting materials.

According to the embodiment shown in the Figures, the forward and return strands 20, 22 are arranged side by side in a substantially horizontal plane. As a variant, the forward strand 20 may be arranged above the return strand 22.

The conveyor belt 12 has two large opposite faces 24, 26. A first large face 24 is intended to receive materials to be transported. A second large face 26 is oriented towards the support station 14 and is in contact with the latter.

The turning rollers are arranged at two opposite longitudinal ends of the belt conveyor 10. The forward strand 20 and the return strand 22 each extend from one turning roller to the next.

The support stations 14 are, for example, buried. They may be placed in a trench 28.

According to one embodiment, the photovoltaic cells 16 are in the form of a plate arranged above at least one buried support station 14. This configuration makes it possible to obtain a high surface area of photovoltaic cells 16 by using the space already occupied by the support stations 14. According to this embodiment, the photovoltaic cells 16 are able to be moved, for example when maintenance operations must be performed on a support station 14.

As a variant or in addition, the photovoltaic cells 16 may be supported by at least one pole.

The support stations 14 are distributed longitudinally along the conveyor belt 12.

For example, the support stations 14 may be successively separated by a distance of between 1 m and 50 m, and advantageously equal to 10 m. By successive support stations is meant two support stations which follow one another longitudinally along the conveyor belt.

The support stations 14 are configured to support the conveyor belt 12 by its second large face 26.

Figure 2:
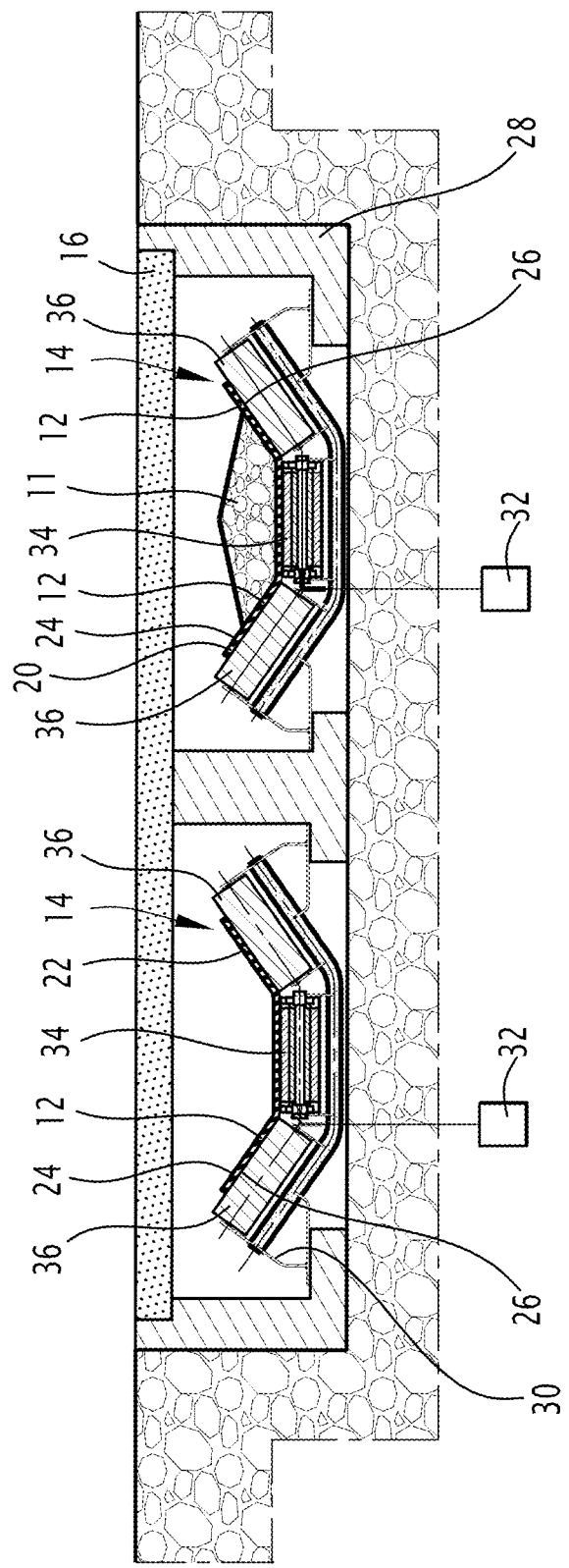
FIG. 2 is a sectional view of the belt conveyor of FIG. 1.

As shown in FIG. 2, each support station 14 comprises a frame 30. The frame 30 is typically rigidly fixed to the trench 28 or to the ground.

At least one support station 14 comprises a drive motor 32 and a drive member 34 of the conveyor belt 12. According to the embodiment shown in the Figures, each support station 14 comprises a drive motor 32 and a drive member 34 for the conveyor belt 12. As a variant, at least one support station 14 out of four, advantageously one out of six, more advantageously one out of eight, may comprise a drive motor 32 and a drive member 34 of the conveyor belt 12.

According to the embodiment shown in the Figures, the support stations 14 equipped with a drive motor 32 and a drive member 34 for the conveyor belt 12 are successively separated by a distance between 1 m and 15 m, preferably between 3 m and 7 m.

According to another embodiment, non-illustrated, the support stations 14 equipped with a drive motor 32 and a drive member 34 for the conveyor belt 12 are grouped into sets, each set comprising between two and fifteen motorized support stations 14, preferably between two and ten motorized support stations 14, preferably again between four and eight motorized support stations 14. Each set is advantageously mounted on top of a pylon, as it is described in the application FR0850902 filed in the name of the applicant. The sets of motorized support stations 14 are successively separated by a distance between 15 m and 200 m, preferably between 30 m and 100 m.

These motorized support stations 14 are different from the belt reversal stations, located at the two opposite ends of the conveyor.

Typically, the belt reversal stations are also motorized. When the reversal stations are out of order, the conveyor belt 10 can continue to transport materials thanks to the presence of drive motor(s) 32 on the support station(s) 14. As a variant, the turning stations need not be motorized.

Each support station 14 also comprises at least one support member 36 configured to support the conveyor belt 12 without being driven by the drive motor 32.

Preferably, each support station 14 further comprises a speed variator, which is arranged to control the speed of rotation of the drive motor 32 within a predetermined range.

The drive motor 32 is configured to drive the conveyor belt 12 in the longitudinal direction relative to the support stations 14.

The drive motor 32 is supplied with energy by photovoltaic cells 16 and/or at least one wind turbine 17. As a variant, the drive motor 32 may be powered by a source of energy other than photovoltaic cells or a wind turbine 17, for example via a conventional electrical network.

The drive motor 32 has a moderate electrical power, between 0.1 and 10 kW, and equal, for example, to 1.1 kW.

The drive motor 32 drives the drive member 34 directly, without the interposition of a speed reducer. In other words, the speed of rotation of the output shaft of the drive motor 32 and the speed of rotation of the drive member 34 are the same.

The drive member 34 is rotated by the drive motor 32. The drive member 34 has, for example, a horizontal axis of rotation.

The drive member 34 is in direct contact with the conveyor belt 12, so as to cause the conveyor belt 12 to move in the longitudinal direction.

The drive member 34 may be, for example, a roller, as shown in the Figures. The diameter of the drive member 34 is between 5 and 50 cm, preferably between 9 and 13 cm, and optimally about 11 cm. The linear displacement speed of the conveyor belt 12 is therefore between 0.1 and 20 m/s, preferably between 2 and 6 m/s, and, for example, 4 m/s.

The drive member 34 rolls against the conveyor belt 12, the coefficient of friction between the drive member 34 and the conveyor belt 12 being high enough for the torque transmitted by the drive motor 32 to the member drive 34, this is in turn transmitted from the drive member 34 to the conveyor belt 12.

According to the embodiments shown in the Figures, each support station 14 comprises two support members 36 arranged on either side of the drive member 34.

The support members 36 each have an axis of rotation that is inclined relative to the axis of rotation of the drive member 34. The support members 36 are able to maintain the position of the conveyor belt 12 between them, while allowing its displacement in the longitudinal direction.

The support member 36 may be, for example, a roller.

The variable speed drive is used to vary the nominal speed of the drive motors 32, as a function of the linear speed of movement desired for the conveyor belt 12.

The photovoltaic cells 16 and the wind turbine 17 in the invention are conventional and known to those skilled in the art.

When transporting materials by a belt conveyor 10 as described above, the drive motors 32 drive the drive members 34 in rotation about the axes of rotation thereof. The drive members 34 drive the conveyor belt 12 in the longitudinal direction relative to the support stations 14, which allows the materials arranged on the first large face 24 to move in the longitudinal direction.

Thanks to the invention described above, when a drive motor 32 is out of order, it is not compulsory to stop the operation of the belt conveyor 10. The other functional drive motors 32 continue to ensure good operation of the conveyor belt 12.

In addition, the power of each drive motor 32 is significantly reduced. Indeed, as the drive motors 32 are distributed over the entire length of the conveyor belt 12, each drive motor 32 of the present invention requires only low power. For this reason, the tension in the conveyor belt 12 is significantly reduced. Because the conveyor belt 12 is driven by several drive members 34, the drive force is distributed over the entire length of the conveyor belt 12, which makes it possible to eliminate areas of very high tension.

According to a particularly advantageous application of the invention, the belt conveyor comprises a plurality of support stations 14 each comprising a drive motor 32 and a drive member 34, distributed along the conveyor belt 12. Preferably, the motorized support stations 14 are evenly distributed along the conveyor belt 12.

Such an arrangement of the support stations 14 helps reducing the tension within the conveyor belt 12 and helps reducing the necessary power for each drive motor 32 to drive the conveyor belt 12.

Thus, each drive motor 32 only requiring a low power, it is possible to supply them with energy coming from photovoltaic cells 16 and/or at least one wind turbine 17 and to avoid installing, along the conveyor belt 12, an imposing and complex system for the distribution of electrical energy, for example, from a conventional power grid.

The support stations 14 equipped with a drive motor 32 and a drive member 34 for the conveyor belt 12 are successively separated by a distance between 1 m and 15 m, preferably between 3 m and 7 m, as described above.

Alternatively, the support stations 14 equipped with a drive motor 32 and a drive member 34 for the conveyor belt 12 are grouped into sets, and the sets of motorized support stations 14 are successively separated by a distance between 15 m and 200 m, preferably between 30 m and 100 m, as described above.

In each case, le belt conveyor only comprises motorized support stations. As a variant, non-motorized support stations are arranged between the motorized support stations.

What is claimed is:

1. A belt conveyor, comprising:
a conveyor belt configured to move in a longitudinal direction, the conveyor belt having two large faces, and
a plurality of support stations distributed longitudinally along the conveyor belt, the support stations being configured to support the conveyor belt by one of the large faces,
wherein at least one support station of the plurality of support stations comprises a drive motor configured to drive the conveyor belt in the longitudinal direction relative to the support stations,
wherein the plurality of support stations are placed in a trench,
wherein the drive motor is supplied with energy by photovoltaic cells,
wherein the photovoltaic cells are in the form of a plate arranged above the plurality of support stations placed in a trench, and the photovoltaic cells lay across an entire width of the trench,
wherein each support station comprises at least one support member configured to support the conveyor belt and a frame fixed to the trench or to ground,
wherein a surface of the photovoltaic cells is flush with a surrounding surface thereof, and
wherein the plurality of support stations neither contact nor support the photovoltaic cells.

2. The belt conveyor according to claim 1, wherein the support stations are successively separated by a distance equal to 10 m.

3. The belt conveyor according to claim 1, wherein the at least one support station further comprises at least one drive member for the conveyor belt.

4. The belt conveyor according to claim 3, wherein the at least one drive member comprises a roller.

5. The belt conveyor according to claim 3, wherein the at least one drive member is driven in rotation by the drive motor and is in direct contact with the conveyor belt, so as to cause the displacement of the conveyor belt in the longitudinal direction.

6. The belt conveyor according to claim 3, wherein the drive motor directly drive the drive member without the interposition of a speed reducer.

7. The belt conveyor according to claim 3, wherein the at least one support station further comprises a speed variator arranged to control the speed of rotation of the drive motor within a predetermined range.

* * * * *